(12) United States Patent
DeKeuster et al.

(10) Patent No.: US 7,589,619 B2
(45) Date of Patent: Sep. 15, 2009

(54) APPARATUS AND METHOD TO TRANSFER DATA FROM A TIRE PRESSURE MONITOR TOOL TO A REMOTE OUTPUT DEVICE SUCH AS A PRINTER

(75) Inventors: Michael T. DeKeuster, Franksville, WI (US); Robert E. Davis, Palatine, IL (US); Christopher J. Hockett, Lake Barrington, IL (US)

(73) Assignee: Snap-On Incorporated, Kenosha, WI (US)

( * ) Notice: Subject to any disclaimer, the term of this patent is extended or adjusted under 35 U.S.C. 154(b) by 369 days.

(21) Appl. No.: 11/650,513

(22) Filed: Jan. 8, 2007

(65) Prior Publication Data
US 2008/0164988 A1  Jul. 10, 2008

(51) Int. Cl.
*B60C 23/00* (2006.01)
(52) U.S. Cl. .................................... 340/442
(58) Field of Classification Search ......... 340/442–448; 73/146.8
See application file for complete search history.

(56) References Cited

U.S. PATENT DOCUMENTS

| | | | |
|---|---|---|---|
| 6,414,592 B1* | 7/2002 | Dixit et al. ............... | 340/447 |
| 6,904,796 B2* | 6/2005 | Pacsai et al. ............. | 73/146.8 |
| 7,398,176 B2* | 7/2008 | Bertness .................. | 702/140 |
| 2005/0093687 A1* | 5/2005 | Katou ..................... | 340/445 |
| 2007/0080794 A1* | 4/2007 | Thiele .................... | 340/442 |

OTHER PUBLICATIONS

"Inside the Pressure Gauge," <http://auto.howstuffworks.com/pressure-gauge3.htm>, Nov. 13, 2006.
Pressure/Vacuum Meter: DigiMano 1000, <www.GoNetech.com>, Nov. 13, 2006.
Pressure Meter: DigiGauge 1000, <www.GoNetech.com>, Nov. 13, 2006.
"Universal Plug and Play," Wikipedia, the free encyclopedia, Nov. 6, 2006, pp. 1-6, Wikimedia Foundation, Inc., <http://en.wikipedia.org/wiki/Universal_Plug_and_Play>.
Snap-on® Tire Pressure Monitoring System Tool, Model TPMS1 User Guide, 2005, pp. 1-14, Snap-on Incorporated.
"t.i.p. s.: Tire Inflation Postioning Switch," 2005, Spectrum Composites, Inc. (SCI), Sterling Heights, Michigan, <www.tipstool.com>.
"Universal Serial Bus," Wikipedia, the free encyclopedia, Sep. 7, 2006, pp. 1-16, Wikimedia Foundation, Inc., <http://en.wikipedia.org/wiki/Universal_Serial_Bus>.
"Federal Motor Vehicle Safety Standards; Tire Pressure Monitoring Systems; Controls and Displays," Department of Transportation: National Highway Traffic Safety Administration, pp. 1-150, 49 CFR Parts 571 and 585 RIN 2127-AJ23, <http://tipstool.com/download/Final%20Rule%2004.08.05.htm>, Oct. 10, 2006.

* cited by examiner

*Primary Examiner*—Phung Nguyen
(74) *Attorney, Agent, or Firm*—McDermott Will & Emery LLP (57) ABSTRACT

A tire pressure monitoring tool transmits a triggering signal to a tire sensor; receives a reporting signal from the tire sensor; extracts data from the reporting signal; stores the extracted data; and transmits the stored data to an external device. The transmitted stored data is in a predetermined order, and in a text format.

24 Claims, 12 Drawing Sheets

| REPORT FOR VEHICLE | | | | | |
|---|---|---|---|---|---|
| LOCATION | LEFT FRONT | RIGHT FRONT | RIGHT REAR | LEFT REAR | 920 |
| PRESSURE | 31 | 15 | 37 | 32 | 930 |
| TEMP | 50 | 75 | 52 | 48 | 940 |
| BATTERY | GOOD | LOW | OK | GOOD | 950 |
| SENSOR | 4786 | 9321 | 6912 | 7555 | 960 |
| ERROR | 001 | 002 | 001 | 001 | 970 |

FIGURE 10

| REPORT FOR VEHICLE | | | | | 1010 |
|---|---|---|---|---|---|
|  | PRESSURE | TEMP | BATTERY | SENSOR JD | 1020 |
| LEFT FRONT | 31 | 50 | GOOD | 4780 | 1030 |
| RIGHT FRONT | 15 | 75 | LOW | 9321 | 1040 |
| RIGHT REAR | 37 | 52 | OK | 6912 | 1050 |
| SPARE | 10 | 50 | GOOD | 1234 | 1060 |
| LEFT REAR | 32 | 48 | GOOD | 7555 | 1070 |

653A
TRIGGER
LEFT FRONT

653B
TRIGGER
RIGHT FRONT

653C
TRIGGER
RIGHT REAR

653D
TRIGGER
LEFT REAR

653E
ALL TIRES
TRIGGERED

1200

APPARATUS AND METHOD TO TRANSFER DATA FROM A TIRE PRESSURE MONITOR TOOL TO A REMOTE OUTPUT DEVICE SUCH AS A PRINTER

TECHNICAL FIELD

The present subject matter relates to methods and equipment for transferring data from a tire pressure monitor tool to a remote output device such as a printer.

BACKGROUND

In recent years, new federal laws require that most vehicles be outfitted with Tire Pressure Monitoring Systems (TPMS) by Sep. 1, 2007. There are two basic types of TPMS: indirect, and direct.

Indirect TPMS use a vehicle's existing Anti-lock Braking System (ABS) to monitor and compare the rotational speed of each road wheel. The indirect TPMS infers over-inflation if the rotational speed appears too low (due to a large diameter of an over-inflated wheel), and infers under-inflation if the rotational speed appears too high (due to a small diameter of an under-inflated wheel). Indirect TPMS are relatively inexpensive because they utilize pre-existing ABS sensors to infer over-inflation or under-inflation.

Unfortunately, the indirect TPMS is unable to detect tire deflation of typically less than 30%. Also, tire changes require resetting the system to relearn the dynamic relationship between wheels, creating lifetime maintenance and calibration issues. And, because the system makes differential measurements, it can not independently treat each wheel. Indirect TPMS cannot detect a case in which all four tires are under-inflated to a similar degree, which can easily occur with similar tires over an extended period of neglect. For these reasons, indirect TPMS systems have fallen out of favor.

Direct Tire Pressure Monitoring Systems (TPMS) are relatively expensive because they require additional hardware and software in the vehicle: However, direct TPMS systems are more accurate because they directly and individually measure the pressure of every tire. For example, direct TPMS systems are capable of generating a driver warning when any or all of the tires fall 20% below the manufacturer's recommended cold-inflation pressures. Additionally, direct TPMS may simultaneously directly measure tire temperatures, and thus may compensate for cold-to-warm-running tire-pressure changes and for temperature dependencies within the pressure sensors. For these reasons, direct TPMS appear to be the only systems that will satisfy the strict requirements of new federal regulations.

Typically, a tire sensor is built into a valve stem of a tire, and may transmit information such as a sensor identification (ID), pressure, temperature, battery status, and error codes to a vehicle control module. The tire sensor (or tire pressure monitoring sensor) typically comprises a battery, a communication antenna, a pressure sensor, and a memory for storing a sensor identification.

The tire sensor battery is physically small, and accordingly has a corresponding small energy storage capacity. To maximize the life of the battery, the tire sensor conserves energy by "sleeping" (not measuring pressure or temperature, and not transmitting information) until it receives an triggering signal. For example, a vehicle may send one triggering signal after the engine has been started, and send a second triggering signal after the car has been moving for 5 minutes. After receiving a triggering signal, the tire sensor may measure pressure and temperature, and then transmit the pressure, the temperature, and a sensor ID to a vehicle control module or TPMS of a vehicle. After transmitting, the tire sensor may return to sleep in order to conserve battery energy. Triggering formats include continuous wave, modulated pulse, and magnetic. Different sensor manufacturers may use different triggering formats.

Using unique sensor IDs allows the TPMS to identify a specific tire, and to ignore tires from other cars. A vehicle may have an instrument cluster display (or a vehicle tire pressure monitoring system display) that displays tire positions. The vehicle must be trained or programmed with the position of each specific tire. For example, tire ID 123 may be located at the front left tire location. A tire pressure monitoring tool is used to trigger the tire sensor to transmit the tire ID 123, and thus train the vehicle that the tire with ID 123 is located at the front left position.

Typically, during training the front left tire sensor is triggered first, then the right front tire sensor, next the right rear tire sensor, and finally the left rear tire sensor. Some vehicles also train the spare tire between the right rear and the left rear. Each time that a tire is changed, or a tire position is changed (such as tire rotation), the TPMS must be retrained.

A current conventional tire pressure monitoring tool utilizes six AA size batteries for power to trigger the tire sensor. The conventional tool must be partially disassembled to access and remove the AA batteries for replacement. For example, the Snap-on® Tire Pressure Monitoring System Tool model TPMS 1 uses six AA size batteries. Performance of the tool may degrade as the batteries run down.

Additionally, new tire sensors may require new triggering procedures, and the conventional tool should be regularly updated with new software containing the new triggering procedures. The conventional tool requires a complex procedure to update the programming or software. The complex procedure typically requires following steps: (1) the pressure monitoring tool is partially disassembled by removing an access plate and a battery pack to access an internal communication port; (2) the first end of a first communication line is manually inserted to the internal communication port; (3) the second end of the first communication line is inserted into a programming interface module (PIM); (4) the programming interface module is connected with a second communication line to a computer with Internet access; (5) a mechanic uses the computer to log into an Internet website; (6) if necessary, additional licenses are purchased by the mechanic from an appropriate Internet site; (7) appropriate software is downloaded to the pressure monitoring tool; (8) both communication cables and are disconnected; (9) the battery pack is replaced inside the tool; (10) the access plate is replace on the tool; (11) the programming interface module is stored; and (12) both communication cables are stored for future use.

Unfortunately, the conventional tool is merely a triggering device. The conventional tool merely transmits a triggering signal to the sensor, and the sensor transmits a reporting signal to the a vehicle control module or TPMS of a vehicle. At best, some models of the conventional tool may recognize that a reporting signal has been transmitted by the sensor. Thus, the conventional tool is limited to triggering the sensor for the purpose of training regarding sensor location, but cannot extract, store, and output data from the reporting signal.

Specifically, the conventional tool disadvantageously does not extract data from the reporting signal, does not store the extracted data from the reporting signal, and does not communicate the stored data to an external device.

SUMMARY

The teachings herein improve over conventional tire pressure monitoring tools by transmitting a triggering signal, receiving a reporting signal, extracting data from the reporting signal, storing the extracted data, and communicating the stored data to an external device. In other words, the teachings herein provide a diagnostic tool and method, rather than a mere triggering tool for training the TPMS regarding the location of the sensors.

For example, a portable tire pressure monitoring tool may include one or more antennas for transmitting a triggering signal and/or receiving a reporting signal; a processor; a memory with stored programming for transmitting the triggering signal, receiving the reporting signal, extracting data from the reporting signal, and storing the extracted data; and a communication device for transmitting the stored data to an external device.

Additionally, the memory may have stored programming for extracting and storing data from distinct tire sensors, and for grouping the stored data in a format that identifies the stored data as associated with a single vehicle. The format may be a text format with data organized as an array and adapted to be displayed to a user via a printer.

In accord with another aspect, a method for using a tire monitoring tool comprises transmitting a triggering signal to a tire sensor; receiving a reporting signal from the tire sensor; extracting data from the reporting signal; storing the extracted data; and transmitting the stored data to an external device.

Additionally, the transmitted stored data may be in a predetermined order, in a text format, and may be printed on a printer.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
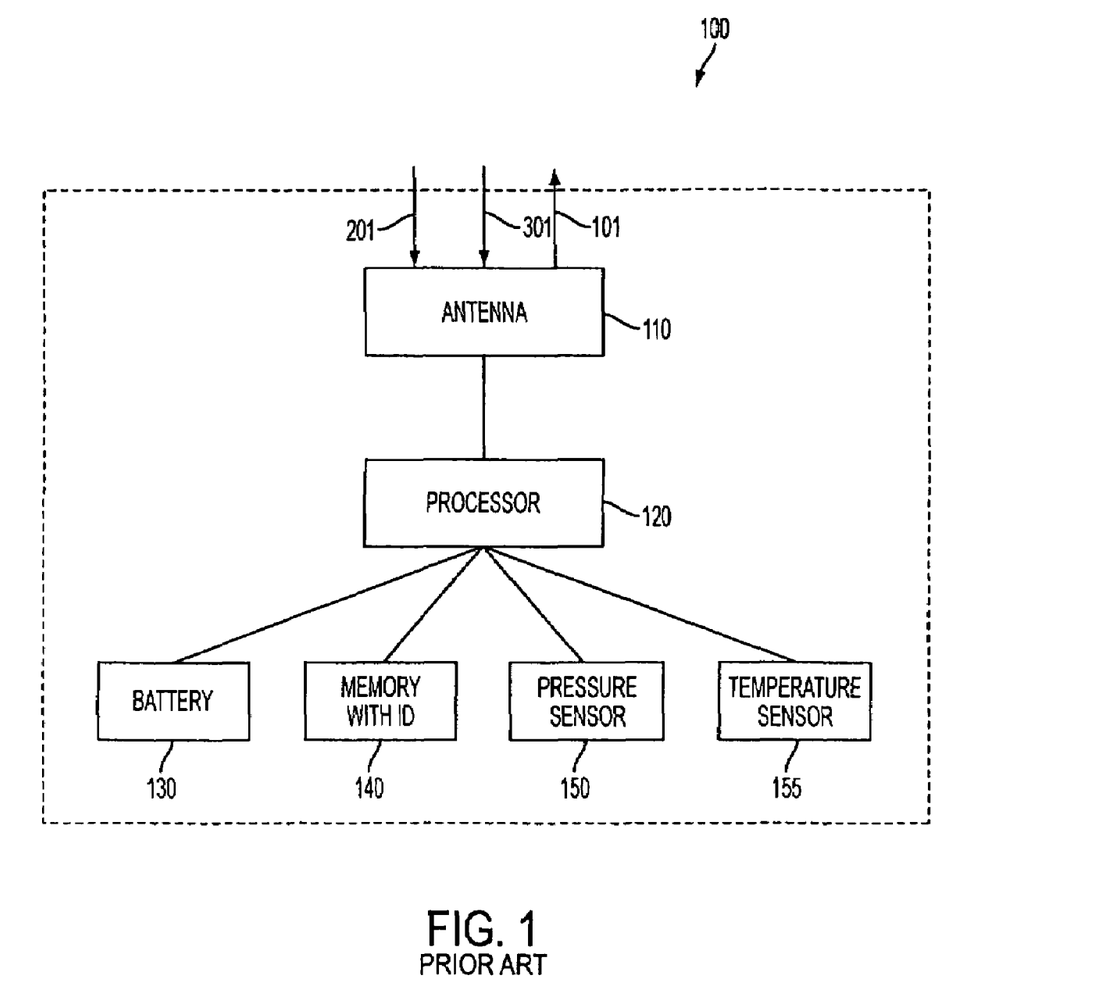
FIG. 1 is a functional block diagram of a conventional tire sensor for a direct measurement Tire Pressure Monitoring System (TPMS).

FIG. 1 is a functional block diagram of a conventional tire sensor for a direct measurement Tire Pressure Monitoring System (TPMS). Tire sensor 100 comprises an antenna 110, a processor 120, a battery 130, a memory 140 storing at least a sensor identification, a pressure sensor 150, and a temperature sensor 155 interconnected as shown. Typically the tire sensor 100 is located at the base of the air stem in a tire. The tire sensor may also have circuitry (not shown) for monitoring the status of the battery 130.

The tire sensor 100 generally remains in sleep mode (not measuring pressure or temperature, and not transmitting) until the tire sensor 100 receives a proper triggering signal through the antenna 110. Triggering signal 201 is generated by a tire pressure monitoring tool (not shown), and triggering signal 301 is generated by the Tire Pressure Monitoring Systems (TPMS) of a vehicle (not shown).

In response to triggering signal 201 or 301, the tire sensor 100 typically wakes up to perform the following functions: recall a sensor identification from memory 140, measure a pressure using pressure sensor 150, measure a temperature using temperature sensor 160, and measure the status of battery 130. After recalling and measuring, the tire sensor 100 transmits a reporting signal 101 which carries the sensor identification and the measured data. The same antenna 110 may be used for receiving triggering signals, and also for transmitting reporting signals.

With ordinary use, the triggering signal 301 will regularly be transmitted by a Tire Pressure Monitoring System (TPMS) of a vehicle. For example, a triggering signal may be transmitted upon start up of the vehicle, and then an additional triggering signal may be transmitted after 5 minutes of driving. Further, during diagnostic testing or when a tire is changed or rotated, then a triggering tool may be used to trigger a specific tire in order to learn the location of the specific tire on the vehicle.

Figure 2:
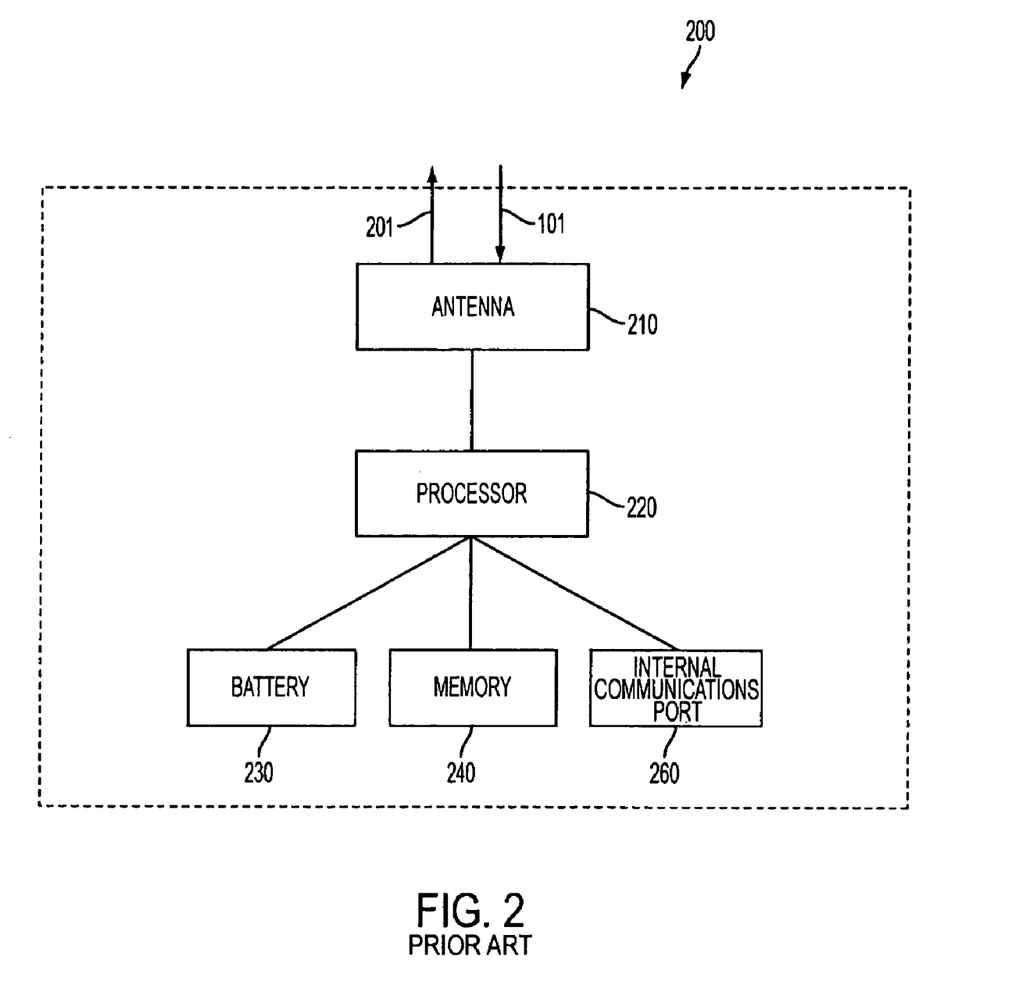
FIG. 2 is a functional block diagram of a tire pressure monitoring tool, for triggering a tire sensor for a direct measurement Tire Pressure Monitoring System (TPMS).

FIG. 2 is a functional block diagram of a tire pressure monitoring tool, for triggering a tire sensor for a direct measurement Tire Pressure Monitoring System (TPMS). Tire pressure monitoring tool 200 comprises an antenna 210, a processor 220, a battery 230, a memory 240, and an internal communications port 260 interconnected as shown. Typically antenna 210 transmits a triggering signal 201 to sensor 100 (FIG. 1). The antenna 210 may receive a reporting signal 101 and the tool 200 may report that the sensor has been triggered. For example, a red LED on the tool 200 may light up indicating that that the sensor 100 (FIG. 1) has been triggered.

Figure 3:
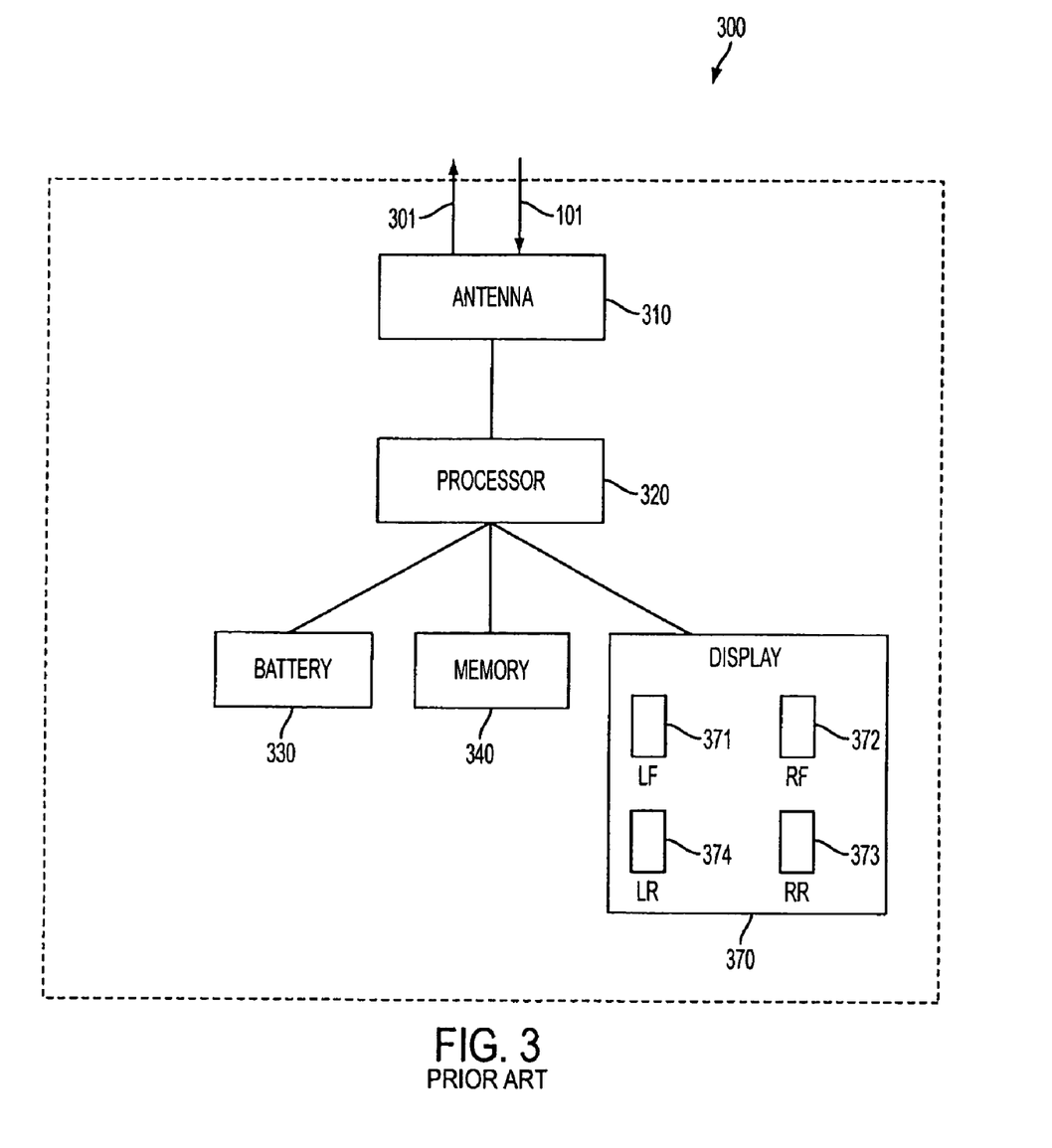
FIG. 3 is a functional block diagram of a Tire Pressure Monitoring Systems (TPMS) of a vehicle, including a typical instrument cluster display (or a vehicle tire pressure monitoring system display) that graphically displays tire positions.

FIG. 3 is a functional block diagram of a Tire Pressure Monitoring System (TPMS) of a vehicle, including a typical instrument cluster display (or a vehicle tire pressure monitoring system display) that graphically displays tire positions. The Tire Pressure Monitoring Systems (TPMS) 300 typically comprises: an antenna 310; a processor 320; a battery 330; a memory 340; and an instrument cluster display 370 with a left front tire icon 371 labeled LF, a right front tire icon 372 labeled RF, a right rear tire icon 373 labeled RR, and a left rear tire icon 374 labeled LR interconnected as shown. The antenna 310 may transmit triggering signal 301, and may receive reporting signal 101. During normal use of a car, a triggering signal may be transmitted upon start up of the vehicle, and then an additional triggering signal may be transmitted after 5 minutes of driving.

Figure 4:
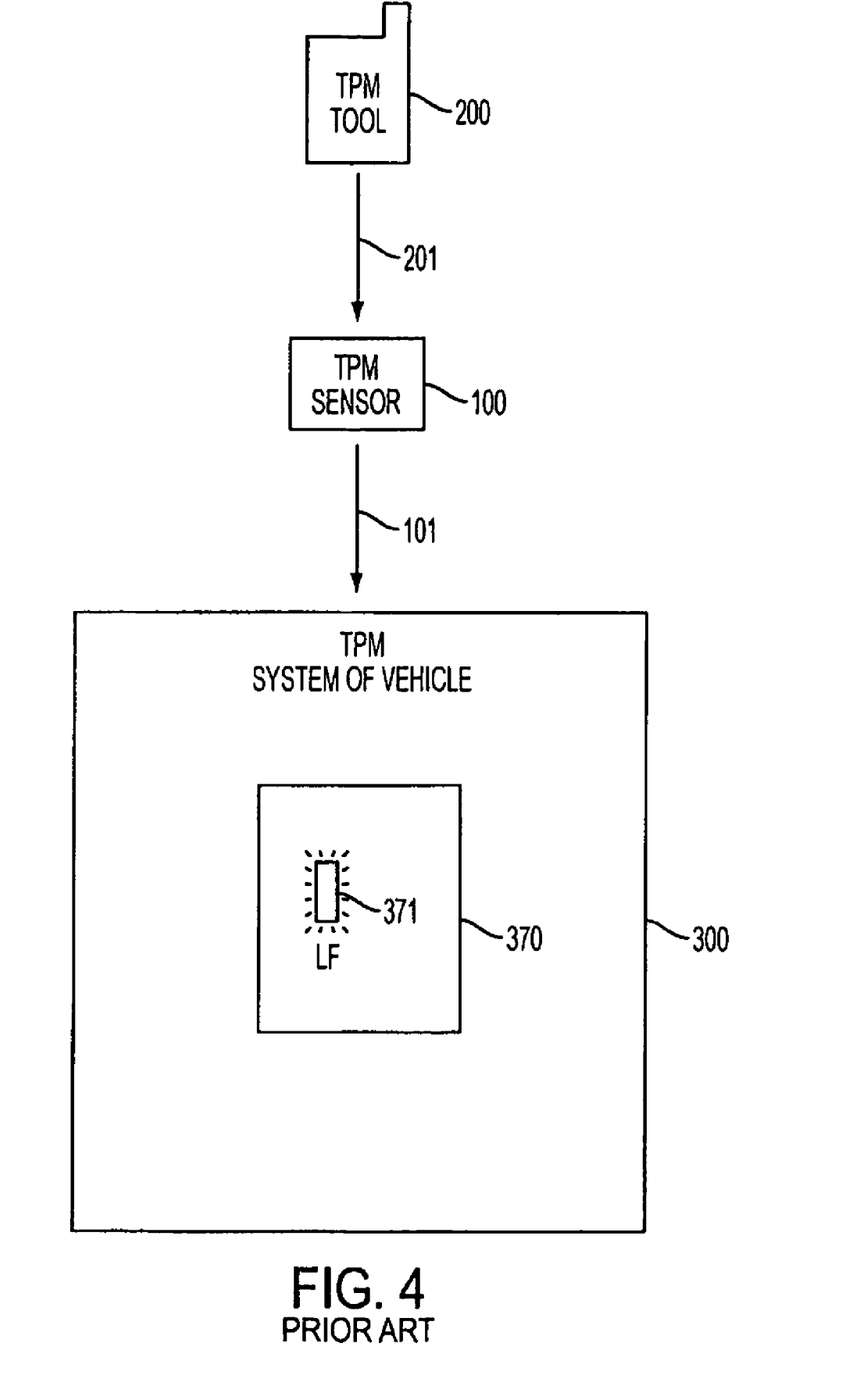
FIG. 4 illustrates a typical training procedure, in which a tire pressure monitoring tool triggers a tire pressure monitoring sensor, and the tire pressure monitoring sensor reports to a Tire Pressure Monitoring Systems (TPMS) of a vehicle.

FIG. 4 illustrates a typical training procedure, in which a tire pressure monitoring tool triggers a tire pressure monitoring sensor, and the tire pressure monitoring sensor reports to a Tire Pressure Monitoring Systems (TPMS) of a vehicle. The tire pressure monitoring tool 200 transmits the triggering signal 201 to the tire pressure sensor 100 of a tire in a known position, for example in the left front position. The tire pressure sensor 100 receives the triggering signal 201 and transmits the reporting signal 101 (a sensor identification and measured data including a tire pressure). The Tire Pressure Monitoring System (TPMS) 300 receives the reporting signal 101, and associates the sensor identification of tire pressure sensor 100 with a specific tire position such as the left front position. The procedure for training or teaching tire pressure sensor positions to the Tire Pressure Monitoring System (TPMS) 300 typically presumes that the first reporting signal 101 received is from a sensor 100 located in the left front tire of the vehicle. The TPMS 300 typically has an instrument cluster display 370 with a left front tire icon 371 labeled LF. The left front tire icon 371 labeled LF may light up or change color to indicate that a sensor identification has been associated with the left front position. The remaining tires may be sequentially triggered in a specified order to train the Tire Pressure Monitoring System (TPMS) 300 regarding the sensor identifications and locations of the remaining tires.

Figure 5:
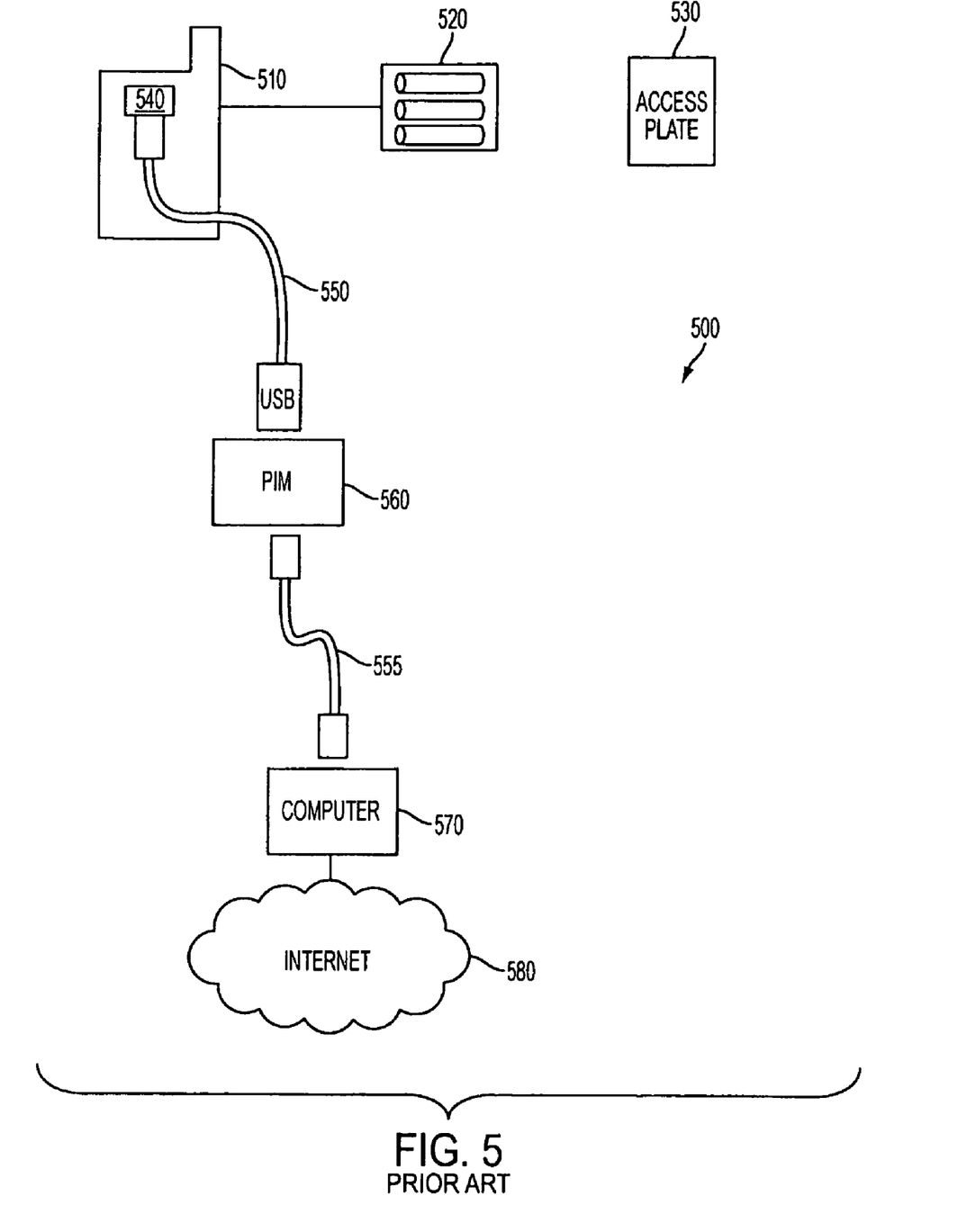
FIG. 5 illustrates a typical arrangement for updating the programming of a tire pressure monitoring tool.

FIG. 5 illustrates a typical arrangement for updating the programming of a tire pressure monitoring tool. A disassembled tire pressure monitoring tool 510 is illustrated. An access plate 530 has been removed to expose the interior of the disassembled tire pressure monitoring tool 510. A battery pack 520 has been removed from the interior to expose an internal communications port 540, but the battery pack 520 remains connected to the interior with power wiring. A first end of a communication line 550 has been inserted into the internal communications port 540, and a second end of the communication line 550 has been inserted into a Programming Interface Module (PIM) 560. Similarly, a second communication line 555 links the Programming Interface Module (PIM) 560 with a computer 570. The computer 570 may be linked to tool service sites or tire manufacturing sites on the Internet 580.

A conventional tool pressure monitoring tool requires a complex procedure to update the programming or software for triggering new tire sensors. The procedure typically requires following steps: (1) the tire pressure monitoring tool 510 is partially disassembled by removing the access plate 530 and the battery pack 520 to access the internal communication port 540; (2) the first end of the first communication line 550 is manually inserted to the internal communication port 540; (3) the second end of the first communication line 550 is plugged into the programming interface module (PIM) 560; (4) the programming interface module 560 is connected with the second communication line 555 to the computer 570 with Internet 580 access; (5) a mechanic uses the computer 570 to log into an Internet 580 website; (6) if necessary, additionally licenses are purchased by the mechanic from an appropriate Internet site; (7) appropriate software is downloaded to the pressure monitoring tool 510; (8) both communication cables 550 and 555 are disconnected; (9) the battery pack 520 is replaced inside the tool 510; (10) the access plate 530 is replace on the tool 510; and (11) the programming interface module 560 is stored for future use; and (12) both communication cables 550 and 555 are stored for future use.

Figure 6:
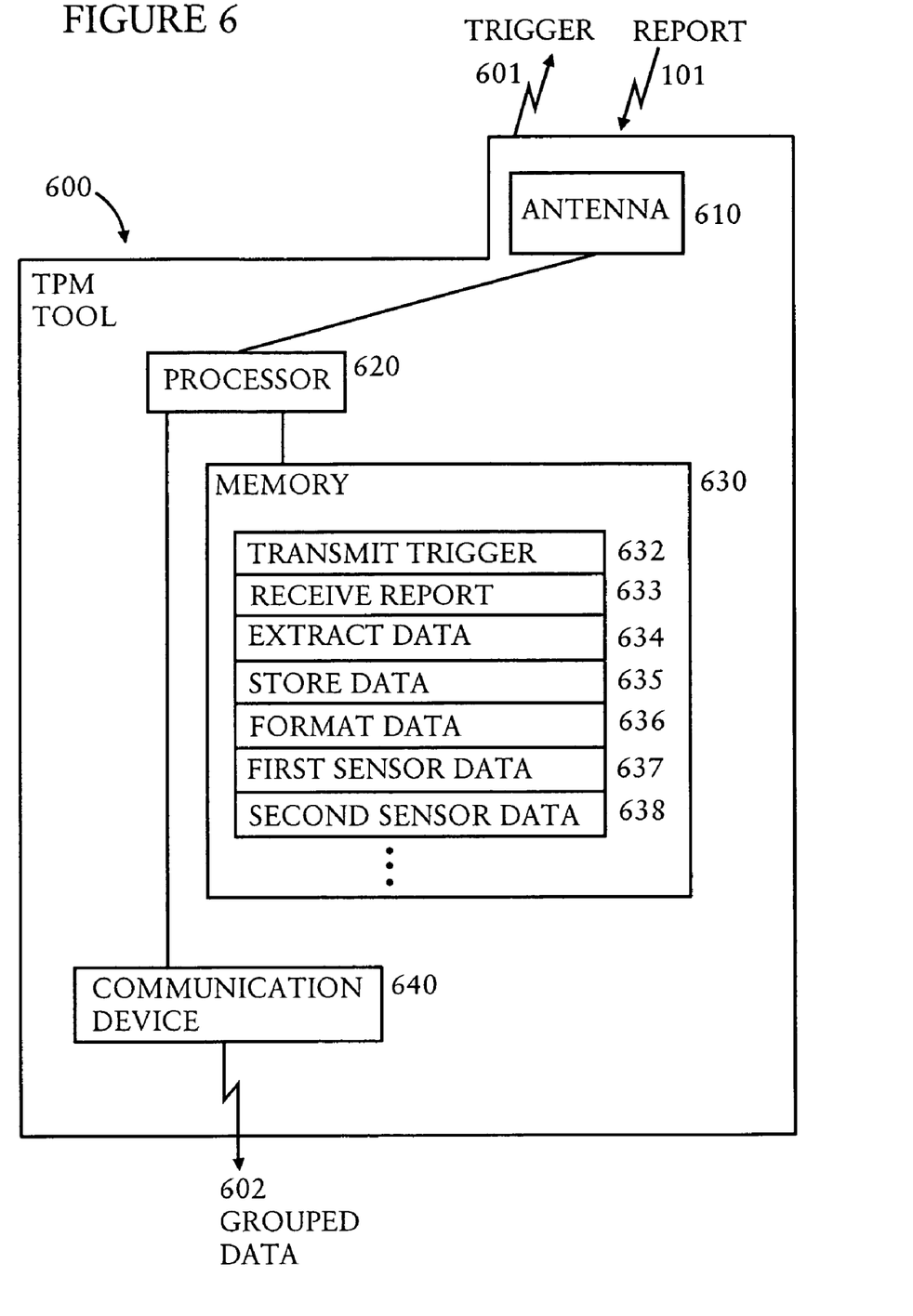
FIG. 6 illustrates an exemplary tire pressure monitoring tool including an antenna, a processor, a memory with programming, and a communications device.

FIG. 6 illustrates an exemplary tire pressure monitoring tool including an antenna, a processor, a memory with programming, and a communication device in accord with the current teachings. Specifically, the tool 600 includes one or more antennas 610 for transmitting a triggering signal 601 and/or receiving a reporting signal 101; a processor 620; a memory 630 with stored programming for transmitting the triggering signal 632, receiving the reporting signal 633, extracting data from the reporting signal 634, storing the extracted data 635 and formatting the extracted data 636. The memory may also have dedicated registers or locations for storing the data from the first sensor 637 and the second sensor 638 according to a predetermined order; and a communication device 640 for transmitting the stored data in grouped format 602 to an external device (not shown).

The tool 600 is adapted to trigger and store data from multiple sensors in a predetermined sequential pattern, and to transmit the data from the multiple sensors in a grouped format. A single antenna may be used for both transmitting the triggering signal 601, and receiving the reporting signal 101. Alternatively, one or more antennas may be used for transmitting the triggering signal, and one or more antennas may be used for receiving the reporting signal.

The stored programming 632 may include different triggering formats such as continuous wave, modulated pulse, and magnetic in order to trigger sensors from different manufacturers. The tool 600 may cycle through different triggering formats for the triggering signal 601 until a reporting signal 101 is received. In one example, the most common format is used first.

The stored programming 633 may include programming for recognizing the reporting signal 101, and may convert an analog reporting signal into digital information.

The stored programming 634 may extract sensor data from the digital information. The sensor data may include data such as sensor identification (ID), pressure, temperature, battery status, and error codes. The temperature data may be used to correct or calibrate the pressure data, because the electrical behavior of piezoelectric pressure sensors may be affected by the temperature. Alternatively, the correction for temperature may be performed later.

The stored programming 635 may store the extracted data in dedicated registers for the first sensor data 637 and for the second sensor data 638.

The stored programming 638 may format the data in a grouped format that identifies the data as associated with a single vehicle, and may format the data in a text format such as the American Standard Code for Information Interchange (ASCII).

Additional stored programming (not shown) may control the communication device 640 for transmitting the grouped data 602 to an external device (not shown).

Figure 7:
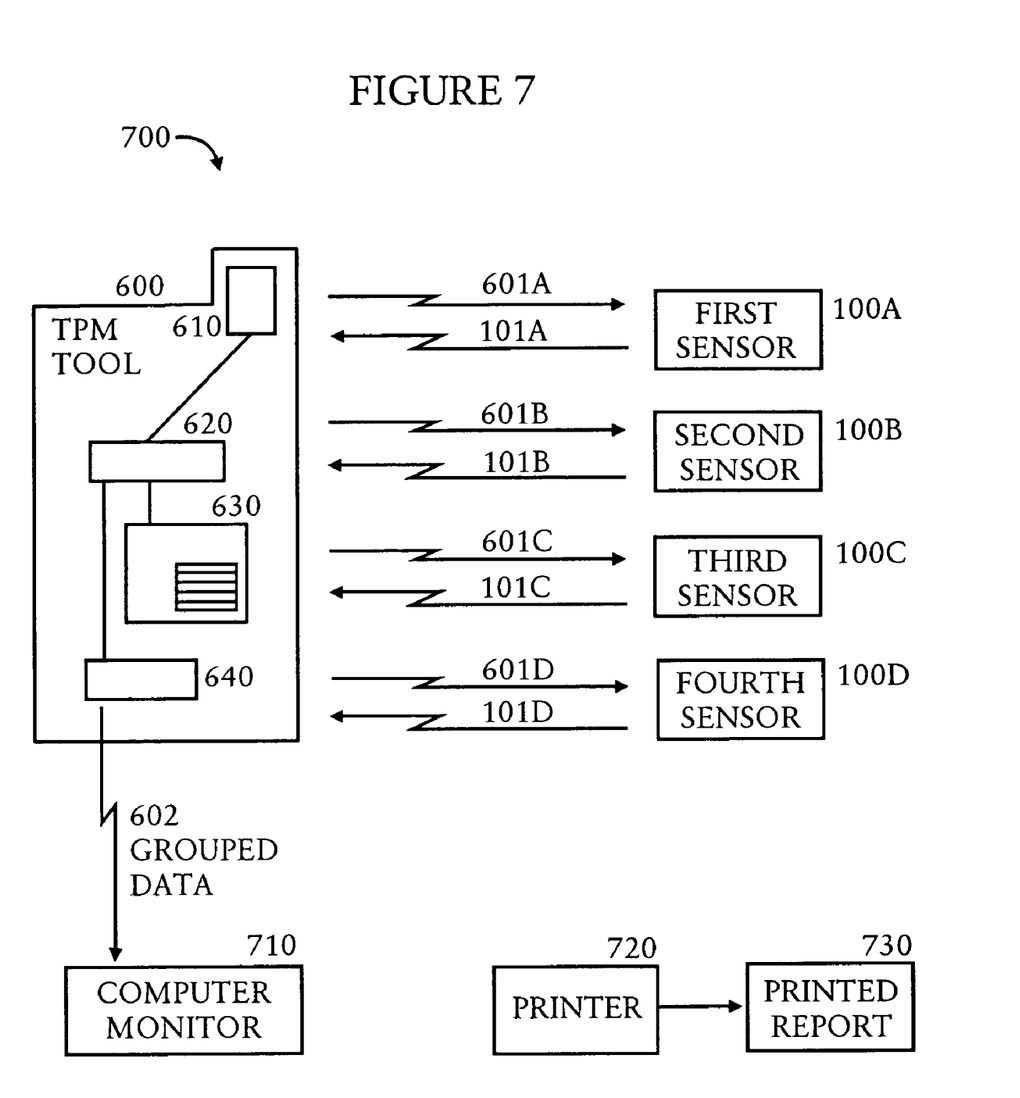
FIG. 7 illustrates an exemplary tool triggering and receiving reports from multiple sensors, and outputting grouped data to a computer monitor or printer.

FIG. 7 illustrates an exemplary tool triggering and receiving reports from multiple sensors, and outputting grouped data to a computer monitor or printer. Following a predetermined sensor order, the tool 600 may transmit a first triggering signal 601A through antenna 610 to a first sensor 100A, and may receive a first reporting signal 101A at antenna 610. The tool 600 may extract, store, and format data from the first reporting signal 101A according to programming stored in the memory 630. Data associated with first sensor 100A may be stored in a dedicated portion of the memory 637.

The tool 600 may then transmit a triggering signal 601B to a second sensor 100B, and may receive a second reporting signal 101B. The tool 600 may process the second reporting signal 101B similarly to the previous reporting signal 101A.

The tool 600 may then proceed with triggering, receiving, and processing any remaining sensors in a predetermined order.

For example, a motorcycle may be triggered in the order of front tire sensor, then rear tire sensor. A three wheeled motorcycle may be triggered in the order of front tire sensor, then rear right, then rear left. A four wheeled car may be triggered in the order of left front, right front, right rear, and left wheel. A four wheeled car with a spare tire may be triggered in the order of left front, right front, right rear, spare, and left rear. Thus, the number of triggered sensors from a vehicle may implicitly contain information identifying both the type of vehicle and the location of each sensor. For example, data from two sensors may imply that the vehicle is a motorcycle, and may imply that the first sensor measured is from the front tire of a motorcycle and the second sensor measured is from the rear tire of a motorcycle.

Alternatively, the tool may have a user interface for entering a location for each sensor. For example, the tool may prompt the user to identify the sensor location by typing "LF" into a keypad to identify the location as left front. Similarly, a touch screen with an icon of a car and 4 tires (a graphical user interface or GUI) may be used to identify the location as left front by touching a tire icon located at the left front of a car icon.

The user interface of the tool may prompt the user regarding which sensor should be triggered next. For example, the user interface may display the instructions "spare tire next." The user interface may include a speaker or earphone stating "the report from spare tire has been successfully received, thank you. Now please trigger the rear left tire."

The user interface may include an icon or command for skipping a location, if the tire corresponding to that location is missing. Programming that allows and recognizes a skipped location is important for generating a complete vehicle report without the user being required to explicitly identify the location of each sensor during the triggering process. A printed report for a vehicle may simply state "skipped" if a spare tire is missing.

The communication device 640 of tool 600 may transmit grouped data 602 to a computer monitor 710, or a printer 720 to generate a printed report 730. The transmitted grouped data 602 may be routed through a computer (not shown), and the computer may process the grouped data 602 into a proper format for displaying or printing.

Figure 8:
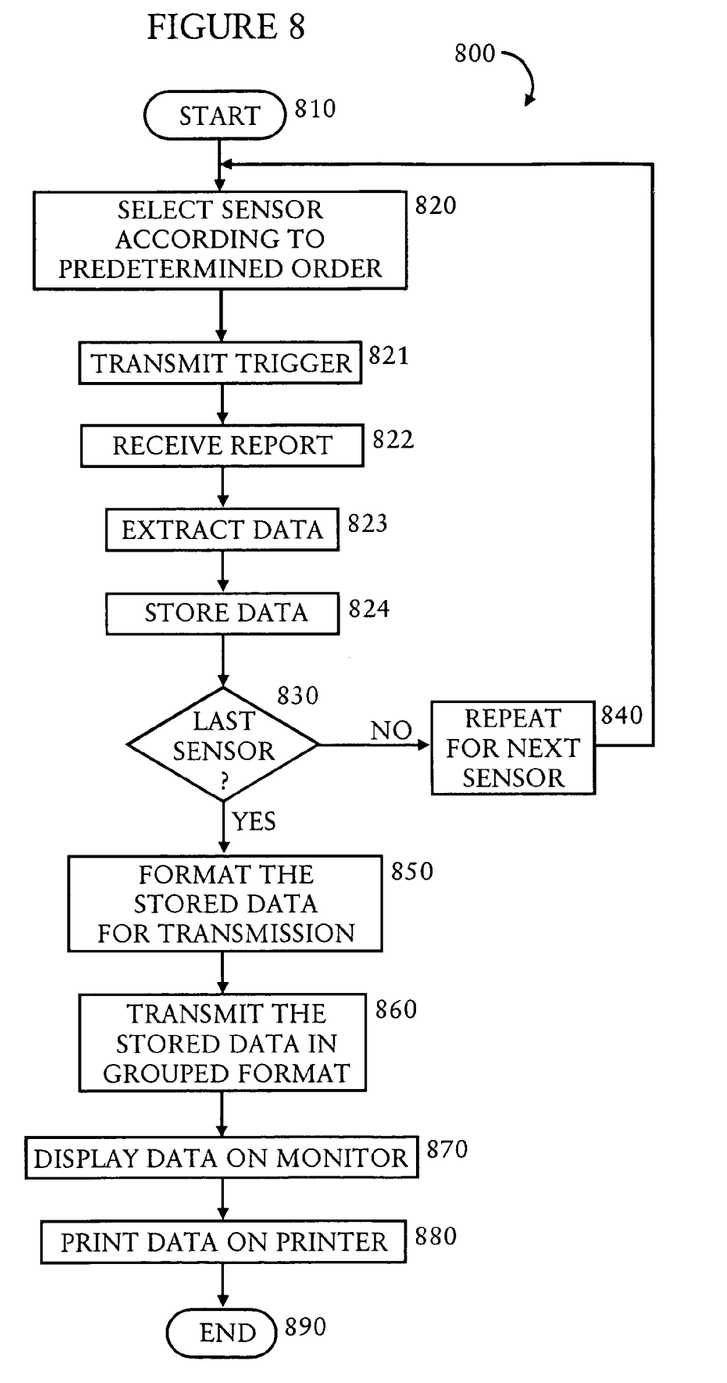
FIG. 8 is a flowchart illustrating an exemplary method of triggering and receiving reporting signals from multiple sensors in a predetermined order.

FIG. 8 is a flowchart illustrating an exemplary method of triggering and receiving reporting signals from multiple sensors in a predetermined order.

In the simplest example (not shown), the user merely takes an arbitrary sequence of tire sensor measurements and the tool stores the sensor data in the order received. In this case, the order for triggering the sensors is arbitrary. The user may have a stack of repaired tires, and may trigger them starting with the bottom tire, and then moving up towards the top tire.

The flowchart of FIG. 8. illustrates an example of intermediate complexity, wherein the sensors are triggered in a predetermined order according to their location on a vehicle. The start 810 may include selecting what type of vehicle will be diagnosed, in order to determine how many sensors should be triggered and in what order they should be triggered. A motorcycle type vehicle may be selected, and the predetermined order may be front tire sensor followed by rear tire sensor. Alternatively, a car without a spare may be selected, and the predetermined order may be left front, right front, right rear, and left wheel. For the purposes of discussion, a car without a spare is selected.

Step 820 selects the left front sensor, and the user positions the tool near the left front tire. Typically the tire sensor is mounted inside the tire valve, and the tool 600 is positioned near the tire valve.

Step 821 transmits a triggering signal. If no reporting signal is promptly received, the tool 600 may transmit a different triggering signal, until a reporting signal is received. Alternatively, the tool may simply transmit an entire sequence of various types of triggering signals.

Step 822 receives a reporting signal. The tool may notify the user that the reporting signal has been received, perhaps by lighting a light emitting diode (LED) or by beeping.

Step 823 extracts data from the reporting signal, and may translate analog signals into digital data.

Step 824 stores the extracted data in the memory. The tool memory 630 may have dedicated storage or registers 637 for the data from the first sensor.

Step 830 determines whether the last sensor has been measured (triggered, received, extracted, and stored 821-824). If the last sensor has not been measured, then the next sensor is selected 820, and is measured (triggered, received, extracted, and stored 821-824).

If step 830 determines that the last sensor has been measured, then step 850 formats the stored data for transmission.

Step 860 transmits the stored data in a grouped format identifying the data as associated with a single vehicle.

Step 870 displays the transmitted data on a monitor.

Step 880 prints the data on a printer.

At the end 890, the user may turn off the tool 600, or may repeat the entire process for a different vehicle.

Figure 9:
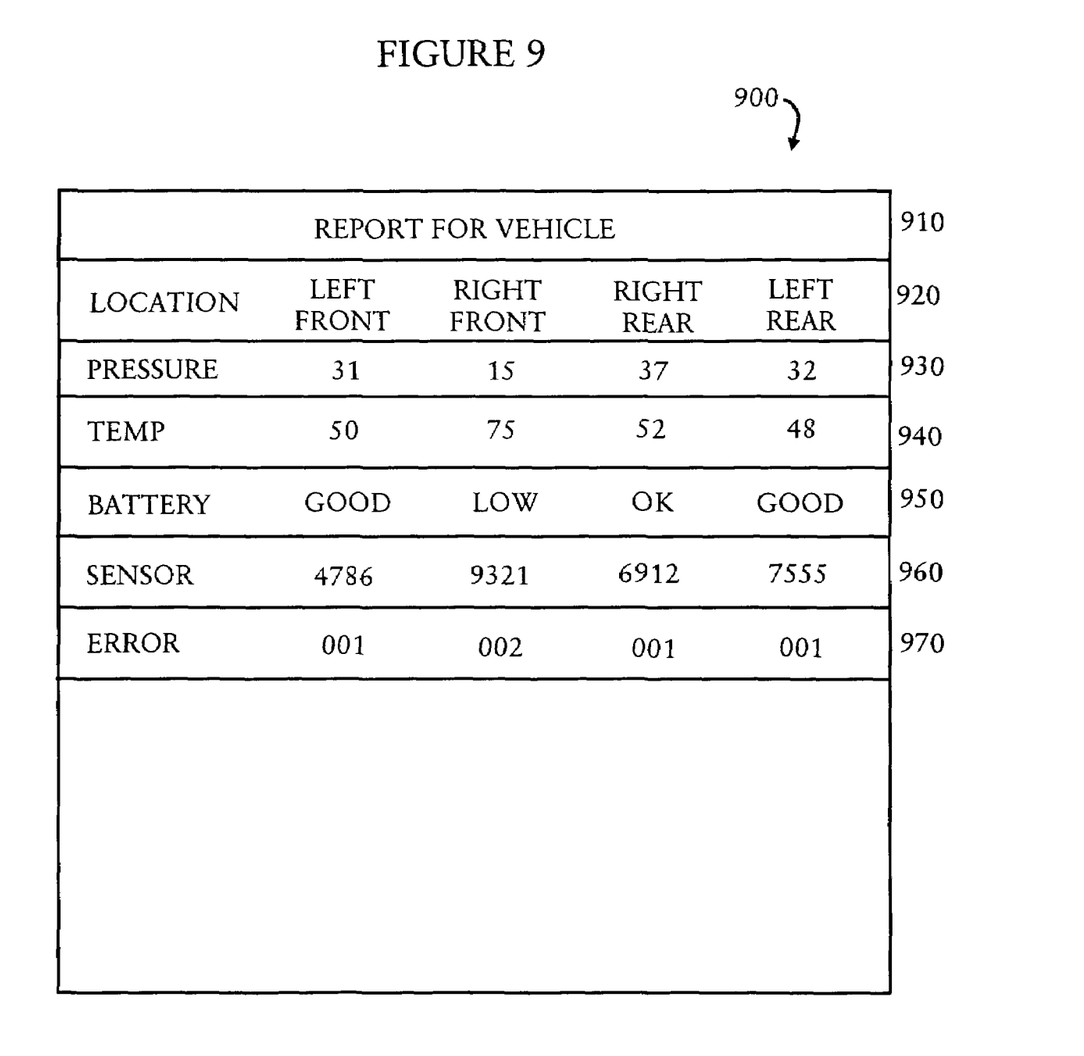
FIG. 9 illustrates an exemplary printed report of the data from four sensors, wherein the data from each sensor is in column format.

FIG. 9 illustrates an exemplary printed report of the data from four sensors, wherein the data from each sensor is in column format. The first line 910 of the report may be a title, and may include a vehicle identification (not shown).

Line 920 states the location of each sensor, such as "LEFT FRONT" for the first column of data.

Line 930 states the pressure (for example, in psi) for each sensor. Metric system units may also be used. The pressure for the RIGHT FRONT tire sensor is only 15 psi, which is low.

Line 940 states the temperature (for example, in degrees Fahrenheit) for each sensor. The temperature of the RIGHT FRONT tire sensor is 75 degrees, which is at least 20 degrees higher than the other sensors. This type of temperature differential is common when driving on under-inflated tires.

Line 950 states the status of each sensor battery.

Line 960 states the identification of each sensor.

Line 970 states any error codes reported by each sensor.

Figure 10:
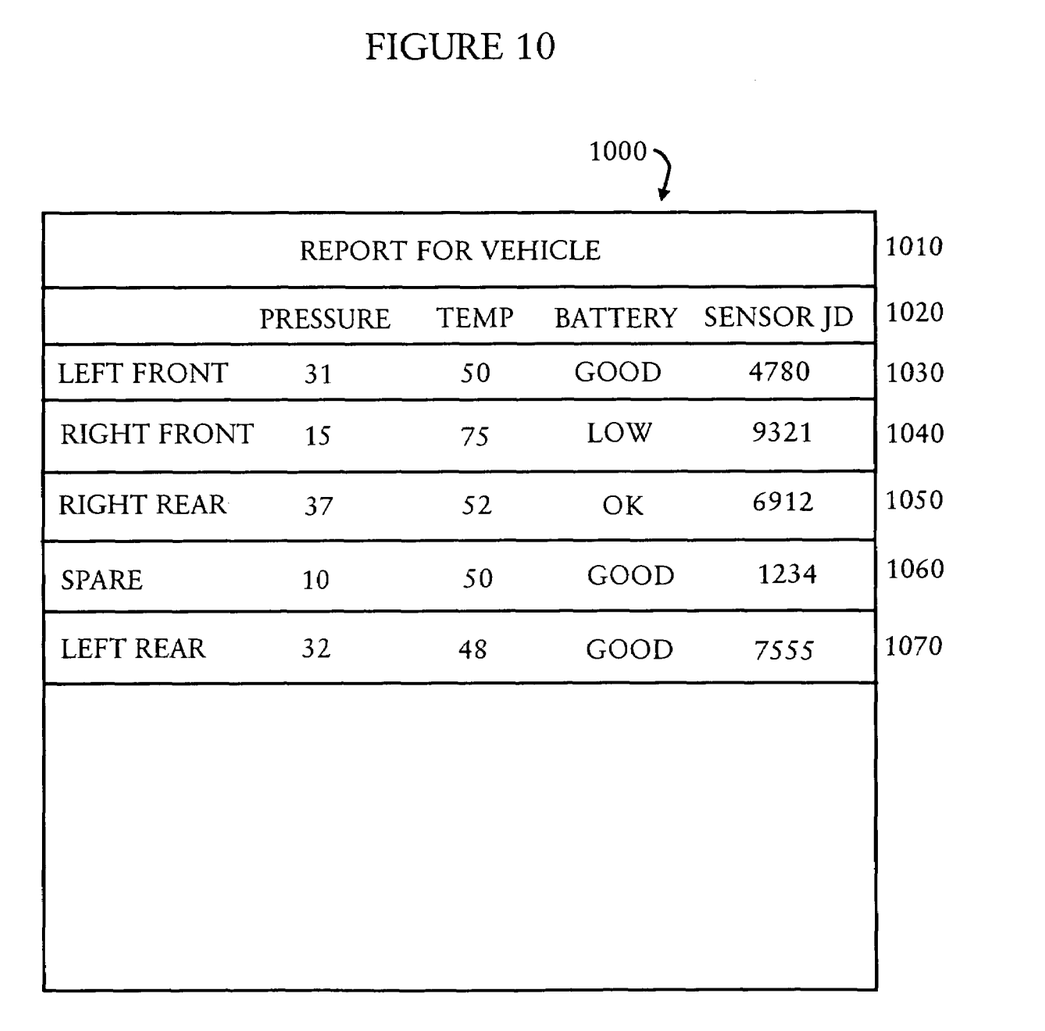
FIG. 10 illustrates an exemplary printed report of the data from five sensors, wherein the data from each sensor is in row format.

FIG. 10 illustrates an exemplary printed report of the data from five sensors, wherein the data from each sensor is in row format. This row format is convenient when the vehicle has many tires, such as a large truck.

Line 1010 states a title for the printed report.

Line 1020 states column headings for each type of data: pressure, temperature, battery status, and sensor identification.

Line 1030 states the data from the LEFT FRONT tire sensor.

Line 1040 states the data from the RIGHT FRONT tire sensor.

Line 1050 states the data from the RIGHT REAR tire sensor.

Line 1060 states the data from the SPARE tire sensor.

Line 1070 states the data from the LEFT REAR tire sensor.

Additional diagnostic conclusions may be presented at the bottom of the printed report. For example, "the pressure is low on the RIGHT FRONT and the SPARE tires."

Figure 11:
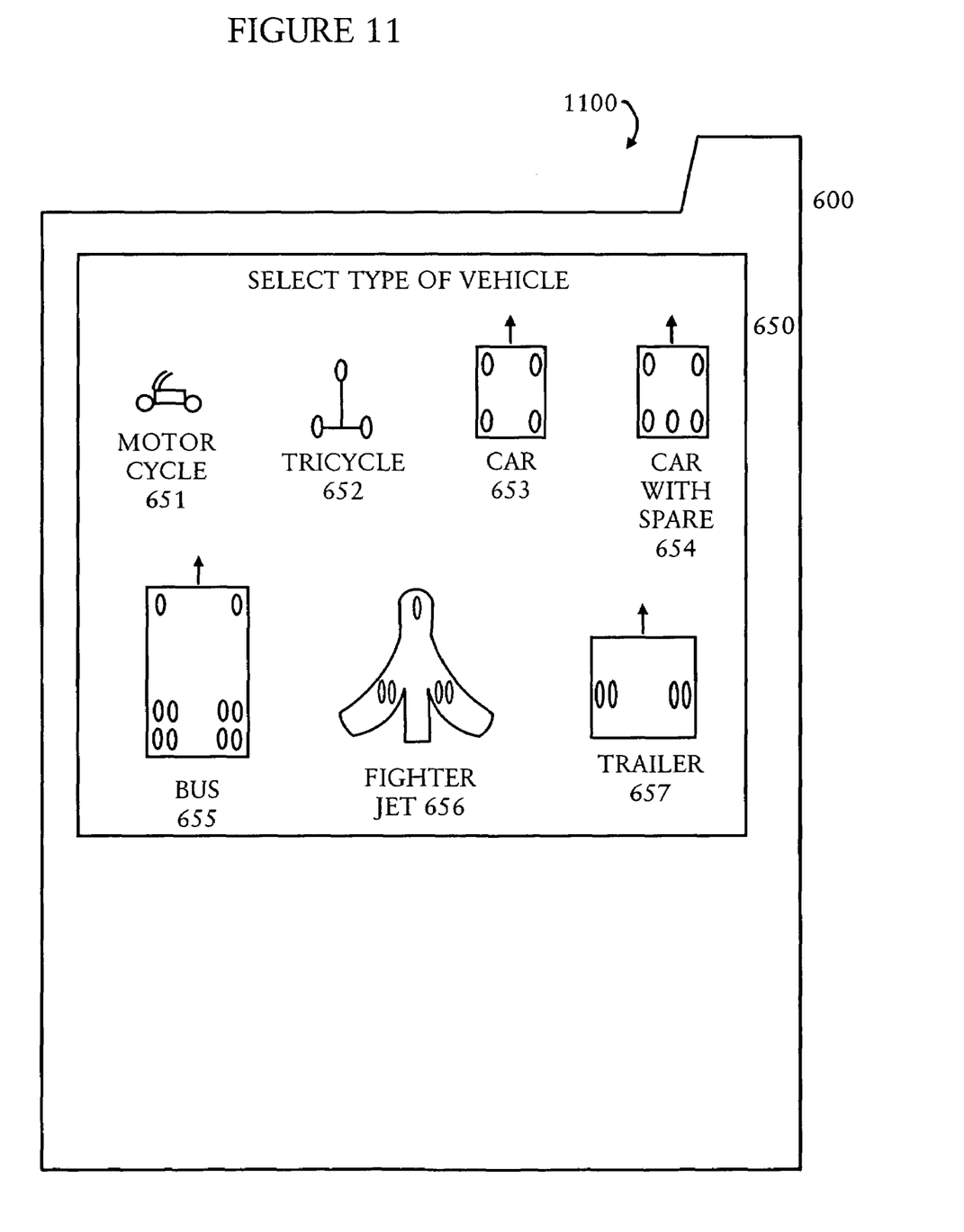
FIG. 11 illustrates an exemplary graphical user interface (GUI) for the tire pressure monitoring tool.

FIG. 11 illustrates an exemplary graphical user interface (GUI) for the tire pressure monitoring tool. Specifically, tool 600 may include a visual display 650 for interacting with the user. The display 650 may display various icons 651-657 representing various vehicles with various tire positions.

Vehicle icon 651 is motorcycle icon with a front tire and a rear tire. The other icons are tricycle 652, car (without a spare) 653, car with a spare 654, bus 655, fighter jet 656, and trailer 657. The user may select a vehicle by touching the appropriate icon on a touch screen, or by highlighting the appropriate icon by pressing various keys (not shown) and then selecting the highlighted icon. Alternatively, a single icon may be displayed, and the user may scroll sequentially until the appropriate icon is displayed.

Figure 12:
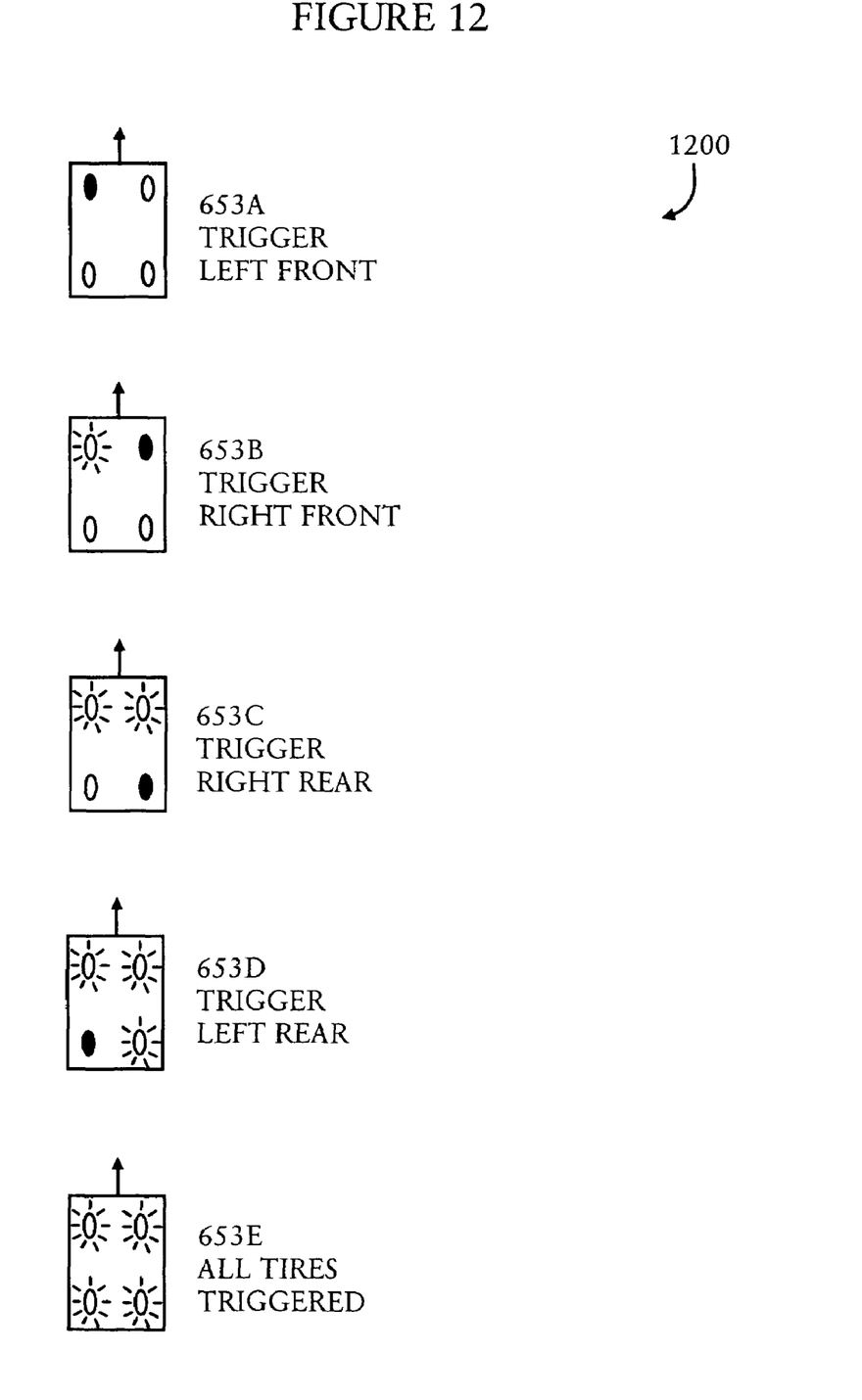
FIG. 12 illustrates an exemplary series of graphical user interface (GUI) icons intended to assist the user in triggering and receiving reports from tire sensors in a predetermined order.

FIG. 12 illustrates an exemplary series of graphical user interface (GUI) icons intended to assist the user in triggering and receiving reports from tire sensors in a predetermined order. After selecting the desired vehicle type from FIG. 11, the vehicle icon is displayed with the target tire darkened, or otherwise visually differentiated front the other tires. For example, icon 653A represents a car with no spare, and the front left wheel is darkened to indicate that the front left tire should be triggered first.

Icon 653B indicates that the front left tire has been triggered and the reporting signal has been received. The front left tire of the icon is highlighted (or otherwise visually differentiated), and the front right tire is darkened to indicate that the front right tire should be triggered next.

Icon 653C indicates that both front tires have been triggered and their reporting signals received. The right rear tire is darkened to indicate that the right rear tire should be triggered next.

Icon 653D indicates that three tires have been triggered and their reporting signals received. The left rear tire is darkened to indicate that the left rear tire should be triggered next.

Icon 653E indicates that all tires have been triggered and all their reporting signals received. The user may transmit grouped data 602 to a printer Alternatively, the user may interact with the icons to select the tire position that the user will trigger next. The predetermined order may merely serve as a default order.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A portable tire pressure monitoring tool comprising:
   a) an antenna for transmitting a triggering signal for multiple tire sensors, and for receiving a reporting signal from the multiple tire sensors;
   b) a processor;
   c) a memory with stored programming, for:
      i) transmitting the triggering signal,
      ii) receiving the reporting signal,
      iii) extracting data from the reporting signal, and
      iv) storing the extracted data; and
   d) a communication device for transmitting the stored data to an external device wherein:
   the stored programming is configured to extract and store data from at least two distinct reporting signals received from two distinct tire sensors, respectively, and
   the stored programming is configured for grouping the stored data in a format that identifies the stored data as associated with a single vehicle.

2. The tool of claim 1, wherein the memory also has stored programming for:
   v) formatting the stored data for transmission.

3. The tool of claim 1, wherein the stored programming is configured to extract and store data from at least four distinct reporting signals received from four distinct tire sensors, respectively.

4. The tool of claim 1, wherein the communication device comprises an electrical contact type communication port.

5. The tool of claim 1, wherein the electrical contact type communication port is a universal serial bus.

6. The tool of claim 1, wherein the communication device is a wireless communication device.

7. The tool of claim 1, wherein the format comprises a text format with data organized as an array; and wherein the text format is adapted to be displayed to a user.

8. The tool of claim 7, wherein the text format is adapted to be displayed to a user via a computer monitor.

9. The tool of claim 7, wherein the text format is adapted to be displayed to a user via a printer.

10. A method for using a tire pressure monitoring tool to trigger, receive, extract, store, and transmit tire sensor data, comprising:
    a) transmitting a triggering signal to a tire sensor;
    b) receiving a reporting signal from the tire sensor;
    c) extracting data from the reporting signal;
    d) storing the extracted data; and
    e) transmitting the stored data to an external device wherein:
    steps a) through d) are repeated once for each tire sensor on a vehicle, and wherein step e) transmits the stored data from each tire sensor on a vehicle in a grouped format that identifies the data as associated with a single vehicle.

11. The method of claim 10, further comprising formatting the stored data for transmission, before transmitting the stored data.

12. The method of claim 10, wherein receiving step b) further comprises sending a visual or audio signal to a tool operator to indicate that a reporting signal has been received.

13. The method of claim 10, wherein receiving step b) further comprises receiving multiple reporting signals in response to a single triggering signal.

14. The method of claim 10, wherein the extracted data comprises a tire sensor identification, a tire pressure, and a tire temperature.

15. The method of claim 14, wherein the extracted data further comprises a tire sensor battery status.

16. The method of claim 14, wherein the extracted data further comprises any error codes present in the reporting signal.

17. The method of claim 10, wherein the tire sensors on a vehicle are triggered in a predetermined order.

18. The method of claim 17, wherein the predetermined order is: front left tire sensor, front right tire sensor, rear right tire sensor, and rear left tire sensor.

19. The method of claim 17, wherein the predetermined order is: front left tire sensor, front right tire sensor, rear right tire sensor, spare tire sensor, and rear left tire sensor.

20. The method of claim 10, wherein the grouped format comprises a text format adapted to be displayed.

21. The method of claim 20, wherein the text format is American Standard Code for Information Interchange.

22. The method of claim 10, further comprising:
f) storing the transmitted data in a computer.

23. The method of claim 10, further comprising:
f) displaying the transmitted data on a computer monitor.

24. The method of claim 10, further comprising:
f) printing the transmitted data on a printer.

* * * * *